(12) United States Patent
Tian et al.

(10) Patent No.: US 11,158,133 B2
(45) Date of Patent: Oct. 26, 2021

(54) METHOD FOR AUTOMATICALLY GENERATING HIERARCHICAL EXPLODED VIEWS BASED ON ASSEMBLY CONSTRAINTS AND COLLISION DETECTION

(71) Applicant: The 38th Research Institute of China Electronics Technology Group Corporation, Anhui (CN)

(72) Inventors: Fujun Tian, Anhui (CN); Xingyu Chen, Anhui (CN); Hongqi Zhang, Anhui (CN); Hongqiao Zhou, Anhui (CN); Yixiong Wei, Anhui (CN); Lei Guo, Anhui (CN); Liangxi Chen, Anhui (CN); Jinwen Zhou, Anhui (CN); Yanlong Zhang, Anhui (CN); Jianjun Su, Anhui (CN)

(73) Assignee: The 38th Research Institute of China Electronics Technology Group Corporation, Hefei (CN)

( * ) Notice: Subject to any disclaimer, the term of this patent is extended or adjusted under 35 U.S.C. 154(b) by 0 days.

(21) Appl. No.: 17/039,306

(22) Filed: Sep. 30, 2020

(65) Prior Publication Data
US 2021/0019956 A1    Jan. 21, 2021

Related U.S. Application Data

(63) Continuation of application No. PCT/CN2019/125956, filed on Dec. 17, 2019.

(51) Int. Cl.
*G06T 19/20* (2011.01)

(52) U.S. Cl.
CPC .......... *G06T 19/20* (2013.01); *G06T 2210/21* (2013.01); *G06T 2219/016* (2013.01); *G06T 2219/2008* (2013.01)

(58) Field of Classification Search
CPC ................ G06T 19/20; G06T 2210/21; G06T 2219/016; G06T 2219/2008
See application file for complete search history.

(56) References Cited

U.S. PATENT DOCUMENTS

| 5,619,630 A | 4/1997 | Minami et al. |
| 2003/0043177 A1 | 3/2003 | Kawai |

(Continued)

FOREIGN PATENT DOCUMENTS

| CN | 103810351 A | 5/2014 |
| CN | 104299271 A | 1/2015 |

(Continued)

OTHER PUBLICATIONS

Xue, Lian et al. ;Research on Marking of 3D Model Based on MBD; Information Technology and Informatization, vol. 5, Dec. 31, 2015, pp. 83-89.

(Continued)

*Primary Examiner* — Chong Wu

(57) ABSTRACT

A method for automatically generating hierarchical exploded views based on assembly constraints and collision detection, in which parts to be exploded are layered in explosion sequence according to a design result of the 3D assembly process planning, and the parts to be exploded in each layer are grouped based on the type and the disassembly direction; a feasible explosion direction of the parts in each layer is determined according to assembly constraints and collision detection; the explosion sequence and explosion direction of the parts in each layer are determined; and then the layered explosion is performed at a certain distance. Ball markers and a part-list are generated after all the parts are exploded.

10 Claims, 4 Drawing Sheets

(56) References Cited

U.S. PATENT DOCUMENTS

2003/0097195 A1\* 5/2003 Yamrom ................. G06T 19/20
　　　　　　　　　　　　　　　　　　　　　700/95
2008/0307342 A1　12/2008 Furches et al.
2018/0089362 A1\* 3/2018 Delfino .................. G06T 17/10

FOREIGN PATENT DOCUMENTS

| CN | 104598683 A | 5/2015 |
| CN | 106777550 A | 5/2017 |
| CN | 109872385   | 6/2019 |

OTHER PUBLICATIONS

Zhao, Hongfei et al. Method for Automatic Generation of Exploaded view based on synchronous constraint release; China Mechanical Engineering; vol. 26, Jan. 31, 2015, pp. 70-73.

\* cited by examiner

METHOD FOR AUTOMATICALLY GENERATING HIERARCHICAL EXPLODED VIEWS BASED ON ASSEMBLY CONSTRAINTS AND COLLISION DETECTION

CROSS-REFERENCE TO RELATED APPLICATIONS

This application is a continuation of International Application No. PCT/CN2019/125956 with a filling date of Dec. 17, 2019, which claims the benefit of priority from Chinese Patent Application No. 201910033354.9 with a filing date of Jan. 14, 2019. The content of the aforementioned applications, including any intervening amendments thereto, is incorporated herein by reference.

TECHNICAL FIELD

The present application relates to methods for generating exploded views of an assembly using a three-dimensional software, and more particularly to a method for automatically generating hierarchical exploded views based on assembly constraints and collision detection.

BACKGROUND OF THE INVENTION

Large-scale equipment involved in the fields, such as aviation, aerospace, ship, automobile, engineering machinery and rail transportation, generally has a complex structure, high requirement for precision and a large number of parts and components. Therefore, in order to reveal and analyze their internal structures, the designers usually disassemble the assembly in the form of exploded views to show the relative spatial relationships of the parts and components therein according to sequence, direction and distance. Compared to sectional views and perspective views, the exploded views can clearly show not only the parts and components in an assembly and the assembly constraints therebetween, but also assembly sequences and paths. Currently, the exploded views have been applied to various stages of a product life cycle such as design, process, manufacturing, use, maintenance and repair. For example, the exploded views are used to express design results at the design stage; used to plan the assembly sequences at the process planning stage; used in 3D (three-dimensional) interactive electronic manuals to demonstrate the product performance at the use stage; and used in demo animations to present the product disassembly at the maintenance and repair stage.

Researchers at home and abroad have performed excessive researches on the development of methods for automatically generating exploded views. BRUNO et al. adopt a projection method to roughly determine an explosion direction of a model to automatically generate the exploded views. MOTOMASA et al. provide a method to generate exploded views by specifying the explosion direction and explosion distance of the model according to the assembly manual of the model, but this method cannot automatically generate the exploded views. Carrea et al. adopted a model layering method to continuously peel the model to display the internal details. Bruckner et al. succeed in partially achieving the automatic explosion by disassembling the model based on mechanical principles. In China, Yu Jiapeng et al. (Northeastern University) proposed an algorithm for automatically generating hierarchical exploded views based on recursive iteration, in which the depth-first search on the hierarchical assembly sequence is iterated to calculate the accumulative bounding box of exploded components in real time, thereby determining the displacement vector of the components to be exploded and automatically generating the exploded views with uniform intervals, compact structure and strong spatial hierarchy. Yu Jiapeng, Wang Chengen et al. proposed a method for automatically generating exploded views of complex products based on an assembly sequence planning algorithm and component geometric information, and further develop a digital assembly sequence planning system for the complex products based on the UG NX platform to verify the algorithm. Xing Yufei et al. proposed a method for automatically generating partial exploded views, in which the ant colony algorithm is adopted to solve the explosion sequence of the parts to reduce the calculation complexity. Zhao Hongfei et al. (the PLA University of Science and Technology) disclosed a method for generating the exploded drawings based on synchronous constraint release. The above-mentioned researches have promoted the development of automatic generation technologies of the exploded views, and some research results have already been applied in engineering.

Currently, most commercial 3D CAD systems, such as Dassault's CATIA, Siemens' UG NX and PTC's Creo, have an automatic explosion function. However, there are still some deficiencies in the automatic explosion function of the existing commercial 3D CAD systems, such as incomplete explosions, unreasonable locations and failure in further adjustment, failing to meet the efficiency and accuracy requirements in engineering applications. For example, the exploded views generated by an automatic explosion tool provided by CATIA are not very satisfactory since the model is in a mess after the explosion, and it is also difficult to adjust the explosion distance and the explosion state of a single model, which renders the existing automatic explosion tool low in use value, failing to meet application requirements for the exploded views at all stages of the product life cycle.

SUMMARY OF THE INVENTION

An object of the invention is to provide a method for automatically generating hierarchical exploded views based on assembly constraints and collision detection to reduce the number of trail explosions to increase explosion efficiency.

The present invention is achieved by the following technical solutions.

The invention provides a method for automatically generating hierarchical exploded views based on assembly constraints and collision detection, comprising:

(1) layering a product or components to be exploded, and determining parts to be exploded in each layer;

(2) grouping the parts to be exploded in each layer;

wherein parts to be exploded in each group are the same or of the same type, and have the same disassembly direction;

(3) performing a trial explosion on the parts to be exploded in each layer after grouped, to determine a feasible trial explosion direction of the parts to be exploded in each layer, thereby determining an explosion sequence and an explosion direction of the parts to be exploded in each layer, and performing a hierarchical explosion at a certain distance;

wherein the trial explosion is performed through steps of: constructing an assembly constraint feature library; determining a trial explosion direction of a part to be exploded based on an assembly constraint feature thereof; moving the part a small distance along the trial explosion direction thereof, and checking whether the part after moved interfere with other parts; if no interference occurs, it indicates that the part are able to be exploded in the trial explosion direction thereof in a current state, and the trial explosion direction is recorded as a feasible explosion direction of the part to be exploded; otherwise, the part fails to be exploded in the trial explosion direction in the current state; and (4) after the parts in respective layers are completely exploded, generating ball markers and a part-list for respective parts.

In an embodiment, in step (1), the layering of the parts to be exploded is determined through steps of: obtaining assembly procedure information of the product or components to be exploded from a 3D assembly process planning system to determine parts to be assembled in each assembly procedure, wherein each assembly procedure corresponds to a layer in the layered explosion, and parts involved in an assembly procedure are parts to be exploded in an explosion layer corresponding to the assembly procedure.

In an embodiment, in step (3), the assembly constraint feature library of each of the parts to be exploded is constructed through steps of: analyzing assembly constraints of parts in mechanical products and classifying the assembly constraints; defining a trial explosion direction of each category of the assembly constraints to form the assembly constraint feature library; wherein for parts with a contact constraint, a trail explosion direction is a normal direction of a plane, and for parts with a coaxial constraint, a trial explosion direction is an axis direction.

In an embodiment, in step (3), if there is a feasible trial explosion direction for a part to be exploded, all trial explosion directions are saved; if there is no feasible trial explosion direction for a part to be exploded, it indicates that the part fails to be exploded in current status; after the trial explosion of all parts in a layer is completed, the trial explosion is continuously performed on parts without a feasible trial explosion direction in the last trial explosion.

In an embodiment, in step (3), the explosion sequence of the parts to be exploded in each layer is determined based on the number of rounds of the trial explosion; wherein in the first round of the trial explosion, parts with a feasible trial explosion direction are exploded ahead of parts without a feasible trial explosion direction, that is, the parts with a feasible trial explosion direction in the first round of the trial explosion are exploded ahead of parts with a feasible trial explosion directions in the second round of the trial explosion, and so on.

In an embodiment, after a round of the trial explosion in a layer is completed, parts with a feasible trial explosion direction in this round are moved by a certain explosion distance along the feasible explosion direction thereof to avoid affecting the next round of the trial explosion in this layer.

In an embodiment, if a new explosible model occurs in a certain direction, all models previously exploded in this direction are moved by a certain explosion distance, thereby making the explosion of the parts to be exploded hierarchical.

In an embodiment, in step (3), the explosion direction of the parts to be exploded is determined as follows: if a part only has one feasible explosion direction, the part is exploded in this feasible explosion direction; if a part has multiple feasible explosion directions for, a direction in which most parts on this layer are exploded is selected as the explosion direction of the part.

In an embodiment, in step (3), according to a size of an assembly bounding box of the components or product to be exploded, the explosion distance explDis is calculated as follows:

$$\exp lDis = \frac{L_{dir}}{2(L+W+H)}(L+W+H)$$

wherein L, W and H are respectively a length, width and height of the size of the assembly bounding box of the components or product to be exploded; $L_{dir}$ is the maximum size of the assembly bounding box of the components or product to be exploded in the explosion direction; if the explosion direction is X, $L_{dir}=L$; if the explosion direction is Y, $L_{dir}=W$; and if the explosion direction is Z, $L_{dir}=H$.

In an embodiment, in step (4), the generated ball markers and part-list are in a bidirectional association with 3D model, when a ball marker is selected, a row in the part-list corresponding to the ball marker and a 3D model of a corresponding part are highlighted; when a row in the part-list is selected, a corresponding ball marker and a 3D model of a part are highlighted.

Compared to the prior art, the invention has the following advantages.

The invention provides a method for automatically generating hierarchical exploded views based on assembly constraints and collision detection, which is used in the operation and maintenance stage of the product life cycle. Compared to the exploded view-generating function of a commercial CAD system, the present invention is simple in design, and can effectively reduce the number of the trial explosions and improve the explosion efficiency by layering the parts to be exploded according to the explosion sequence, grouping the parts in each layer and determining the direction of the trial explosion according to assembly constraints and collision detection. Meanwhile, the invention has a good explosion effect, which meets the requirements of use and training manuals for the exploded views during the operation and maintenance state of the product.

DETAILED DESCRIPTION OF EMBODIMENTS

The invention will be described in detail below with reference to the embodiments. It should be noted that the embodiments are merely illustrative of the invention, and are not intended to limit the invention.

(1) Layering of parts to be exploded in explosion sequence.

Figure 1:
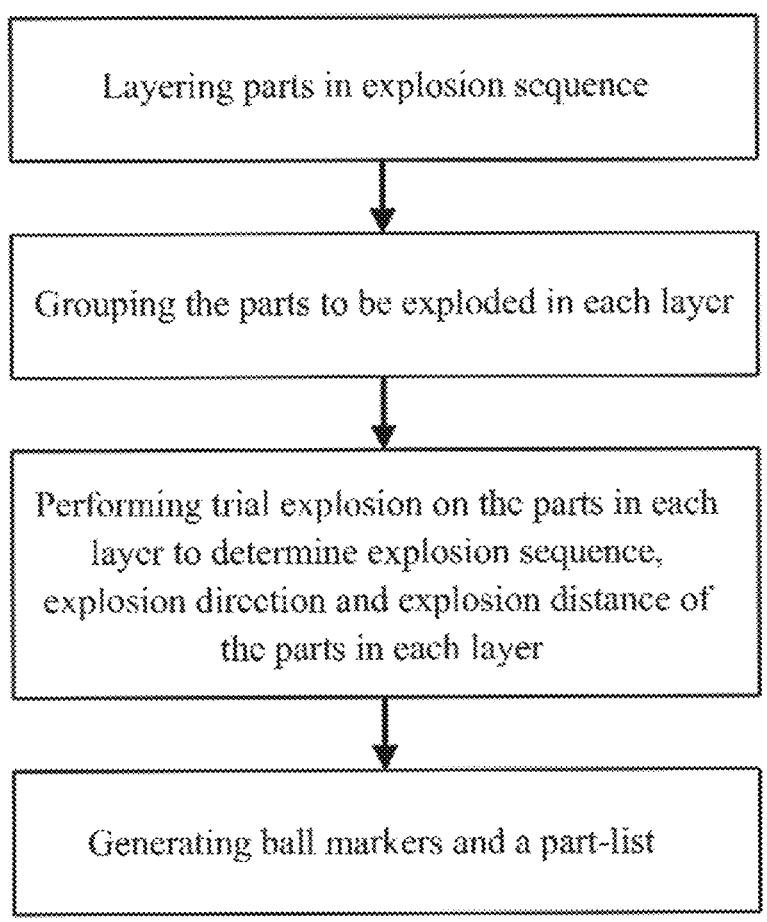
FIG. 1 is a flowchart of a method according to the present invention.
Figure 2:
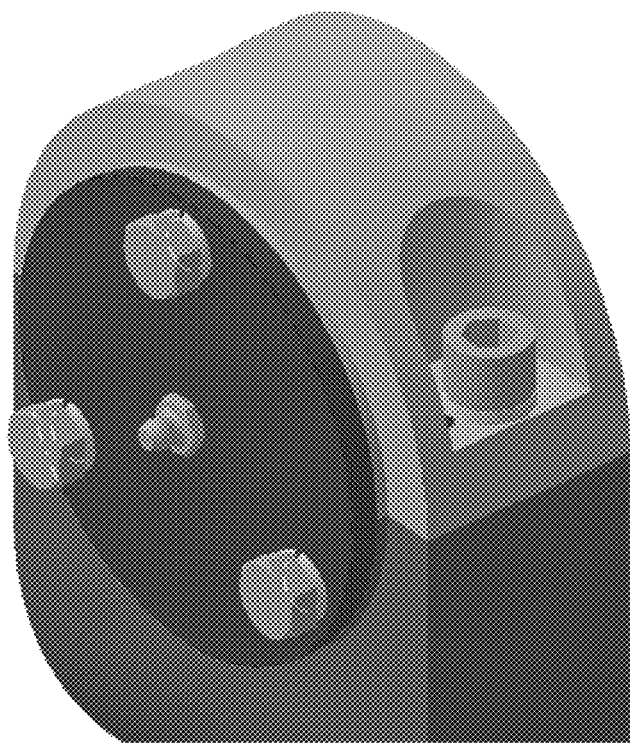
FIG. 2 is a schematic diagram of an assembly according to an embodiment of the present invention.
Figure 3:
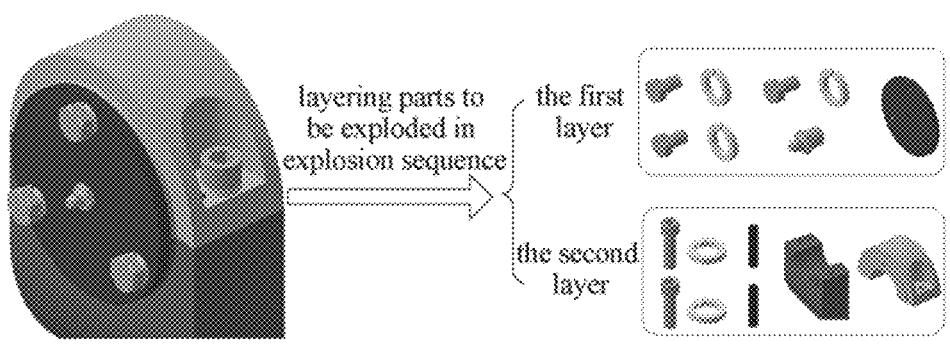
FIG. 3 schematically shows the layering of parts to be exploded in explosion sequence according to the embodiment.

In order to reduce the number of subsequent explosions and improve automatic explosion efficiency, assembly procedure information of a product or components to be exploded are firstly obtained from a 3D assembly process planning system to determine the parts to be assembled in each assembly procedure. The product or components to be exploded are layered and the parts to be exploded in respective layers are determined. The determination method is described as follows: each assembly procedure corresponds to a layer in the layered explosion, and parts involved in an assembly procedure are parts to be exploded in an explosion layer corresponding to the assembly procedure. FIG. 2 is a schematic diagram of an assembly to be exploded. As showed in FIG. 3, according to the assembly procedure, the parts of the assembly are layered into two layers to be sequentially exploded.

(2) Grouping of the parts to be exploded in each layer.

Figure 4:
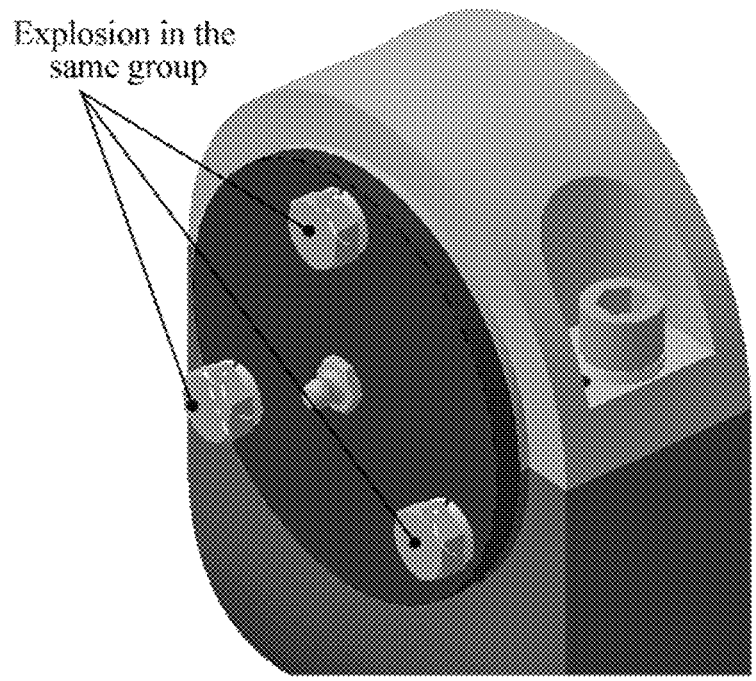
FIG. 4 schematically shows the grouping of the parts in each layer according to the embodiment.

In order to improve the explosion efficiency and effect, the parts to be exploded in each layer are grouped, based on a principle that the parts in a group should be the same or of the same type, and have the same disassembly direction. For example, in the case that 6 threaded connections consistent in the axis direction are required to fasten a component, 6 nuts, 6 washers and 6 bolts are respectively grouped together. As shown in FIG. 4, 3 screws are grouped together.

(3) Trial explosion of the parts to be exploded in each layer, and determination of explosion sequence, explosion direction and explosion distance of the parts.

After the parts to be exploded are layered and grouped, a trial explosion is performed on the parts to be exploded in each layer after grouped to determine a feasible explosion direction of the parts to be exploded in each layer, thereby determining an explosion sequence and an explosion direction of the parts in each layer, and a layered explosion is performed at a certain distance.

Figure 5:
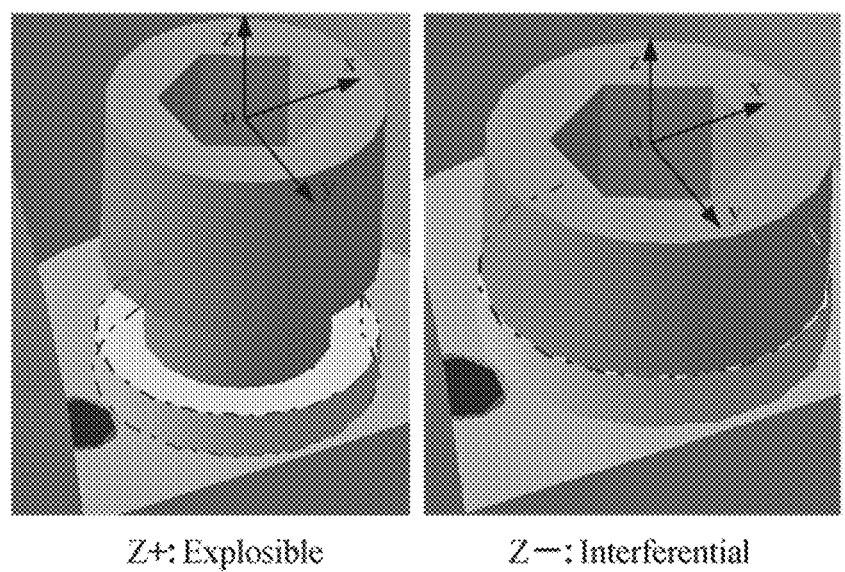
FIG. 5 schematically shows the trial explosion of the parts according to the embodiment.

The assembly constraint feature library of the parts to be exploded is constructed as follows: assembly constraints of parts in mechanical products are analyzed and classified; a trial explosion direction of each assembly constraint is defined to form the assembly constraint feature library. Specifically, for the parts with a contact constraint, the test explosion direction is a normal direction of a plane, and for the parts with a coaxial constraint, the trial explosion direction is an axis direction. On this basis, a trial explosion direction of a part to be exploded is determined based on an assembly constraint feature thereof; The part is moved a small distance along the trial explosion direction, and whether the part after moved interfere with other parts is checked; if no interference occurs, it indicates that the part to be exploded is able to be exploded in the trial explosion direction in current status, and the trial explosion direction is recorded as a feasible explosion direction of the part to be exploded; otherwise, the part fails to be exploded in the trial explosion direction in the current status. As shown in FIG. 5, a screw and a hole have a coaxial constraint, so the trial explosion direction of the screw may be Z+ or Z−. When the screw is slightly moved along Z+, no interference occurs, so Z+ is a feasible explosion direction of the screw; when the screw is slightly moved along the Z−, an interference occurs, so the part cannot be exploded along this direction. If there is a feasible trial explosion direction for a part to be exploded, all trial explosion directions are saved; if there is no feasible trial explosion direction for a part to be exploded, it indicates that the part fails to be exploded in current status. After the trial explosion of all parts in this layer is completed, the trial explosion is continuously performed on the parts without a feasible trial explosion direction in the last trial explosion.

The explosion sequence of the parts to be exploded in each layer is determined based on the number of rounds of the trial explosion; where in the first round of the trial explosion, the parts with a feasible trial explosion direction are exploded ahead of parts without a feasible trial explosion direction, that is, the parts with a feasible test explosion direction in the first round of the trial explosion are exploded ahead of parts with a feasible trial explosion direction in the second round of the trial explosion, and so on. After a round of the trial explosion in a layer is completed, parts with a feasible trial explosion direction in this round are moved by a certain explosion distance along the feasible explosion direction thereof to avoid affecting results of the next round of the trial explosion in this layer.

Figure 6:
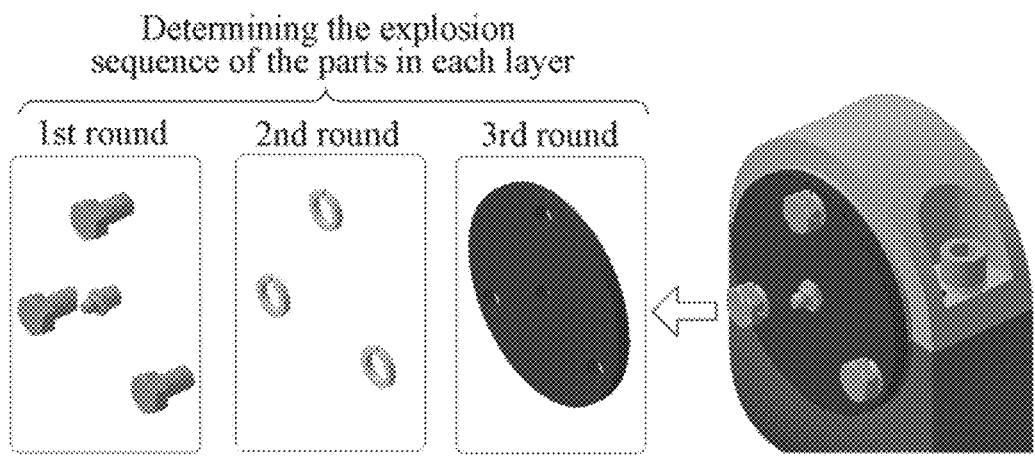
FIG. 6 schematically shows an explosion sequence of the parts in each layer according to the embodiment.

In order to prevent a new explosible model from contacting with the models previously exploded, if a new explosible model occurs in a certain direction, all models previously exploded in this direction are moved by a certain explosion distance, thereby making the explosion of the parts to be exploded hierarchical. As shown in FIG. 6, an explosion sequence of the parts to be exploded in the first layer is determined as follow: the screws and oil plugs are exploded in the first round, the washers are exploded in the second round, and end covers are exploded in the third round.

The explosion direction of the parts to be exploded is determined as follows: if a part only has a feasible explosion direction, the part is just exploded in this explosion direction; if a part has multiple feasible explode directions, a direction in which most parts on this layer are exploded is selected as the explosion direction of the part.

According to a size of an assembly bounding box of the components or product to be exploded, the explosion distance explDis is calculated as follows:

$$\exp lDis = \frac{L_{dir}}{2(L+W+H)}(L+W+H)$$

wherein L, W and H are respective a length, width and height of the size of the assembly bounding box of the components or product to be exploded; Ldir is the maximum size of the assembly bounding box of the components or product to be exploded in the explosion direction; if the explosion direction is X, Ldir=L; if the explosion direction is Y, Ldir=W; and if the explosion direction is Z, Ldir=H.

Figure 7:
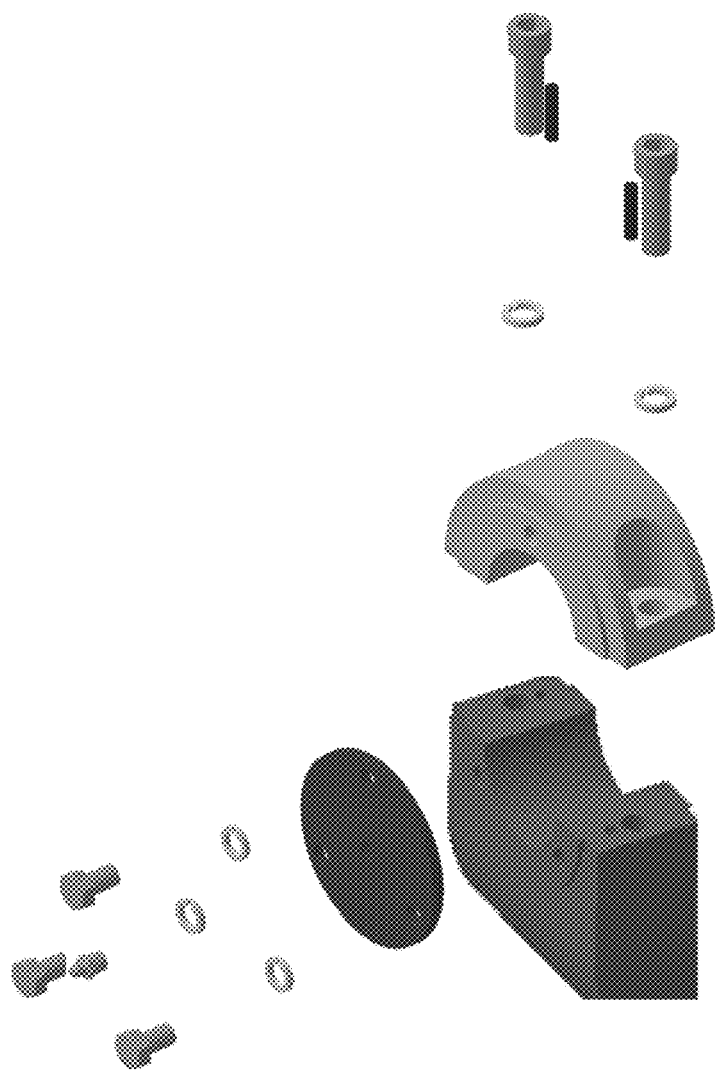
FIG. 7 schematically shows an explosion result of the assembly according to the embodiment.

FIG. 7 schematically shows an explosion result of the assembly according to the embodiment.

(4) Generation of ball markers and part-list;

After the parts in each layer are completely exploded, the ball markers and a part-list of the parts are generated. The generated ball markers and part-list are in a bidirectional association with 3D model. When a ball marker is selected, a row in the part-list corresponding to the ball marker and a 3D model of a corresponding part are highlighted; when a row in the part-list in a row is selected, a corresponding ball markers and a 3D model of a corresponding part are highlighted.

Described above are only preferred embodiments of the present invention, which are not intended to limit the invention. It should be noted that any modification, replacement and improvement made without departing from the spirit of the present invention shall fall within the scope of the present invention defined by the appended claims.

What is claimed is:

1. A method for automatically generating hierarchical exploded views based on assembly constraints and collision detection, comprising:
    (1) layering a product or components to be exploded, and determining parts to be exploded in each layer;
    (2) grouping the parts to be exploded in each layer; wherein parts to be exploded in each group are the same or of the same type, and have the same disassembly direction;
    (3) performing a trial explosion on the parts to be exploded in each layer after grouped, to determine a feasible trial explosion direction of the parts to be exploded in each layer, thereby determining an explosion sequence and an explosion direction of the parts to be exploded in each layer, and performing a hierarchical explosion at a certain distance; wherein the trial explosion is performed through steps of: constructing an assembly constraint feature library; determining a trial explosion direction of a part to be exploded based on an assembly constraint feature thereof; moving the part a distance along the trial explosion direction thereof, and checking whether the part after moved interferes with other parts; if no interference occurs, it indicates that the part to be exploded is able to be exploded in the trial explosion direction thereof in a current state, and the trial explosion direction is recorded as a feasible explosion direction of the part to be exploded; otherwise, the part fails to be exploded in the trial explosion direction in the current state; and
    (4) after the parts in each layer are completely exploded, generating ball markers and a part-list for respective parts.

2. The method of claim 1, wherein in step (1), the layering of the parts to be exploded is determined through steps of: obtaining assembly process information of the product or components to be exploded from a 3D assembly process planning system to determine parts to be assembled in each assembly procedure, wherein each assembly procedure corresponds to a layer in the layered explosion, and parts involved in an assembly procedure are parts to be exploded in an explosion layer corresponding to the assembly procedure.

3. The method of claim 1, wherein in step (3), the assembly constraint feature library of each of the parts to be exploded is constructed through steps of: analyzing assembly constraints of parts in mechanical products and classifying the assembly constraints; defining a trial explosion direction of each category of the assembly constraints to form the assembly constraint feature library; wherein for parts with a contact constraint, a trial explosion direction is along a normal direction of a plane, and for parts with a coaxial constraint, a trial explosion direction is along an axis direction.

4. The method of claim 1, wherein in step (3), after the trial explosion of all parts in a layer is completed, the trial explosion is continuously performed on parts without any feasible trial explosion direction in the last trial explosion.

5. The method of claim 1, wherein in step (3), the explosion sequence of the parts to be exploded in each layer is determined based on the number of rounds of the trial explosion; wherein in the first round of the trial explosion, parts with the feasible trial explosion direction are exploded ahead of parts without any feasible trial explosion direction, the parts with the feasible trial explosion direction in the first round of the trial explosion are exploded ahead of parts with the feasible trial explosion direction in the second round of the trial explosion.

6. The method of claim 5, wherein after a round of the trial explosion in a layer is completed, parts with the feasible trial explosion direction in this round are moved by a certain explosion distance along the feasible explosion direction thereof to avoid affecting the next round of the trial explosion in this layer.

7. The method of claim 6, wherein if a new explosible model occurs in a certain direction, all models previously exploded in this direction are moved by a certain explosion distance, thereby making the explosion of the parts to be exploded hierarchical.

8. The method of claim 1, wherein in step (3), the explosion direction of the parts to be exploded is determined as follows: if a part is able to be exploded in more than one directions, a direction in which most parts on this layer are exploded is selected as the explosion direction of the part.

9. The method of claim 1, wherein in step (3), according to a size of an assembly bounding box of the components or product to be exploded, the explosion distance explDis is calculated as follows:

$$\exp lDis = \frac{L_{dir}}{2(L+W+H)}(L+W+H)$$

wherein L, W and H are respectively a length, width and height of the size of the assembly bounding box of the components or product to be exploded; $L_{dir}$ is the maximum size of the assembly bounding box of the parts to be exploded or the product in the explosion direction; if the explosion direction is X, $L_{dir}$=L; if the explosion direction is Y, $L_{dir}$=W; and if the explosion direction is Z, $L_{dir}$=H.

10. The method of claim 1, wherein in step (4), the generated ball markers and part-list are in a bidirectional association with 3D model; when a ball marker is selected, a row in the part-list corresponding to the ball marker and a 3D model of a corresponding part are highlighted; when a row in the part-list is selected, a corresponding ball marker and a 3D model of a corresponding part are highlighted.

* * * * *